United States Patent
Obara et al.

(10) Patent No.: US 8,133,047 B2
(45) Date of Patent: Mar. 13, 2012

(54) INJECTION MOLDING METAL MOLD AND SHAPED ARTICLE

(75) Inventors: Tomoyuki Obara, Sodegaura (JP); Yukio Ishii, Sodegaura (JP); Tatsuji Kawamura, Sodegaura (JP)

(73) Assignee: Prime Polymer Co., Ltd., Tokyo (JP)

( * ) Notice: Subject to any disclaimer, the term of this patent is extended or adjusted under 35 U.S.C. 154(b) by 287 days.

(21) Appl. No.: 12/440,307

(22) PCT Filed: Sep. 6, 2007

(86) PCT No.: PCT/JP2007/067372
§ 371 (c)(1),
(2), (4) Date: Mar. 6, 2009

(87) PCT Pub. No.: WO2008/029870
PCT Pub. Date: Mar. 13, 2008

(65) Prior Publication Data
US 2010/0040724 A1 Feb. 18, 2010

(30) Foreign Application Priority Data
Sep. 6, 2006 (JP) ................................. 2006-241645

(51) Int. Cl.
*B29C 45/37* (2006.01)

(52) U.S. Cl. .......................... 425/116; 425/121; 425/567
(58) Field of Classification Search .................. 425/116, 425/121, 573, 577; 264/328.12
See application file for complete search history.

(56) References Cited

U.S. PATENT DOCUMENTS

| 4,619,802 | A | * | 10/1986 | Cloeren | 264/173.16 |
|---|---|---|---|---|---|
| 5,538,413 | A | * | 7/1996 | Gardner et al. | 425/145 |
| 5,653,932 | A | * | 8/1997 | Aida et al. | 264/219 |
| 5,833,913 | A | * | 11/1998 | Ellwood et al. | 264/328.7 |
| 6,030,197 | A | * | 2/2000 | Takahashi et al. | 425/121 |
| 6,379,603 | B1 | * | 4/2002 | White et al. | 264/328.2 |
| 6,387,313 | B1 | * | 5/2002 | Chang et al. | 264/328.2 |
| 6,660,196 | B1 | * | 12/2003 | Iwase et al. | 264/73 |
| 6,991,450 | B1 | * | 1/2006 | Stephens, II | 425/461 |
| 7,296,992 | B2 | * | 11/2007 | Timmons et al. | 425/382.4 |
| 7,442,021 | B2 | * | 10/2008 | Kim et al. | 425/127 |

(Continued)

FOREIGN PATENT DOCUMENTS
EP  0 677 369 A1  10/1995
(Continued)

OTHER PUBLICATIONS

Extended Supplementary European Search Report issued on Jan. 27, 2011 in corresponding European Application No. 07 80 6813.

*Primary Examiner* — Yogendra Gupta
*Assistant Examiner* — Emmanuel S Luk
(74) *Attorney, Agent, or Firm* — Oblon, Spivak, McClelland, Maier & Neustadt, L.L.P.

(57) ABSTRACT

An injection-molding die including: a fixed die; a movable die; a cavity defined by the fixed die and the movable die; and a gate for injecting a melt resin into the cavity. The cavity includes: a flow-dividing structure that divides a flow of the melt resin injected into the cavity into a plurality of resin flows; and a flow-advancing area in which the resin flows generated by the flow-dividing structure are merged together. The flow-advancing area is formed thicker than a flow-hesitating area of the flow-advancing area in the cavity.

7 Claims, 4 Drawing Sheets

U.S. PATENT DOCUMENTS

| | | | | |
|---|---|---|---|---|
| 7,862,846 | B2 * | 1/2011 | Rasmussen | 426/564 |
| 2003/0122281 | A1 * | 7/2003 | Osawa et al. | 264/328.12 |
| 2003/0209825 | A1 * | 11/2003 | Timmons et al. | 264/40.7 |

FOREIGN PATENT DOCUMENTS

| | | |
|---|---|---|
| JP | 58 60421 | 4/1983 |
| JP | 62 111711 | 5/1987 |
| JP | 3 43220 | 2/1991 |
| JP | 5 293856 | 11/1993 |
| JP | 2000 280303 | 10/2000 |
| JP | 2000 334743 | 12/2000 |
| JP | 2002 86506 | 3/2002 |
| JP | 2002-192575 A | 7/2002 |
| JP | 3411142 | 3/2003 |

\* cited by examiner

INJECTION MOLDING METAL MOLD AND SHAPED ARTICLE

TECHNICAL FIELD

The present invention relates to an injection-molding die for injecting a melt resin into a cavity of the die for molding, and to a molded product.

BACKGROUND ART

Automobile interior parts such as installment panel and door panel are typically manufactured by injection molding. In manufacturing such parts, reduction in manufacturing cost without deterioration in favorable appearance has been demanded.

However, when injection molding is conducted with use of a die having a plurality of gates for injecting a melt resin, weld (also known as weld line or weld mark) is generated at an area where a plurality of resin flows are merged together, which leads to deterioration of favorable appearance. The same problem also arises when a resin flow is divided and subsequently merged together with use of a die for providing molded products having openings.

While products with weld have been conventionally subjected to post-process such as coating and touch-up in order to keep a predetermined level of appearance quality, such post-process unfavorably increases manufacturing cost.

Thus, several proposals have been made on an injection-molding die and an injection-molding method capable of suppressing generation of weld and providing molded products for which no post-processing is required. According to one exemplary proposal, a die is provided with a heat insulation structure, so that resin flows are merged together at high temperature for prevention of generation of weld (patent document 1).

Patent Document 1: JP-A-2000-334743

DISCLOSURE OF THE INVENTION

Problems to be Solved by the Invention

However, since the arrangement of the patent document 1 requires the die to be provided with a special structure and part, the die tends to have a complex structure, thereby increasing the cost.

An object of the invention is to provide an injection-molding die capable of making weld less noticeable and providing molded products having favorable appearance without relying on post-process or special device, and to provide molded products of favorable appearance molded with use of the die.

Means for Solving the Problems

An injection-molding die according to an aspect of the invention includes: a fixed die; a movable die; a cavity defined by the fixed die and the movable die; and a gate for injecting a melt resin into the cavity, in which the cavity includes: a flow-dividing structure that divides a flow of the melt resin injected into the cavity into a plurality of resin flows; and a flow-advancing area in which the resin flows generated by the flow-dividing structure are merged together, and the flow-advancing area is formed thicker than a flow-hesitating area of the flow-advancing area in the cavity.

According to the aspect of the invention, since the flow-advancing area, where the plurality of resin flows generated by the flow-dividing structure are merged together, is formed thicker than the flow-hesitating area, the melt resin exhibits less flow resistance at the flow-advancing area relative to the flow-hesitating area. This arrangement realizes generation of a resin flow (merged resin flow) that starts from the resin-flow merger point where the resin flows are initially merged together in the flow-advancing area and flows along the flow-advancing area. In other words, while the resin flows confront each other at the flow-advancing area to be sequentially merged together when a conventional die is used, the merged resin flow is generated to flow along the flow-advancing area according to the aspect of the invention. Thus, weld becomes less noticeable particularly at the surface portion. Accordingly, without relying on post-process or special apparatus, molded products having favorable appearance can be obtained.

An injection-molding die according to another aspect of the invention includes: a fixed die; a movable die; a cavity defined by the fixed die and the movable die; and a plurality of gates for injecting a melt resin into the cavity, in which the cavity includes a flow-advancing area in which resin flows of the melt resin injected from the plurality of gates are merged together, and the flow-advancing area is formed thicker than a flow-hesitating area of the flow-advancing area in the cavity.

According to the aspect of the invention, since the flow-advancing area, where flows of melt resins injected from different gates are merged together, is formed thicker than the flow-hesitating area, the melt resin exhibits less flow resistance at the flow-advancing area relative to the flow-hesitating area. This arrangement realizes generation of a resin flow (merged resin flow) that starts from the resin-flow merger point where the resin flows are initially merged together in the flow-advancing area and flows along the flow-advancing area. In other words, while the resin flows confront each other at the flow-advancing area to be sequentially merged together when a conventional die is used, the merged resin flow is generated to flow along the flow-advancing area according to the aspect of the invention. Thus, weld becomes less noticeable particularly at the surface portion. Accordingly, without relying on post-process or special apparatus, molded products having favorable appearance can be obtained.

Preferably in the aspect of the invention, a thickness (a) of the flow-hesitating area and a thickness (b) of the flow-advancing area satisfy a relationship of $0.4 \leq a/b \leq 0.9$. More preferably, a relationship of $0.5 \leq a/b \leq 0.85$ is satisfied therebetween.

According to such an arrangement, since the thickness (a) of the flow-hesitating area and the thickness (b) of the flow-advancing area satisfy the relationship of $0.4 \leq a/b \leq 0.9$, favorable fluidity of the melt resin can be secured. Thus, the merged resin flow can be easily generated, so that weld becomes much less noticeable. When "a/b" above is less than 0.4, a large thickness difference leads to a large shrinkage difference, thereby unfavorably causing defective appearance such as sink and uneven luster. On the other hand, when "a/b" above is more than 0.9, the difference between the thickness (a) of the flow-hesitating area and the thickness (b) of the flow-advancing area is so small that the melt resin may not exhibit sufficient fluidity.

Preferably in the aspect of the invention, at least either one of the fixed die and the movable die includes protrusions provided at positions to interpose the flow-advancing area therebetween and protruding into the cavity, and the protrusions provide the flow-hesitating area of the flow-advancing area in the cavity, the positions of the protrusions being spaced apart by a predetermined distance from a resin-flow merger point in a direction in which the resin flow is headed, the resin-flow merger point being a point at which the resin flows are initially merged together in the flow-advancing area.

According to such an arrangement, since the flow-hesitating area (i.e., thinner area defined by the protrusions within the cavity) allows less passage of the melt resin, a resin flow having passed through the flow-hesitating area becomes a small flow. On the other hand, since the protrusions are provided at the positions spaced apart by the predetermined distance from the resin-flow merger point (i.e., where the merger of the resin flows initially takes place in the flow-advancing area) in the direction where the resin flow is headed, the melt resin can flow to the resin-flow merger point without restriction, so that the resin flows can be merged together without hindrance. With this arrangement, a large merged resin flow flows along the flow-advancing area while changing a direction of the small flow having passed through the flow-hesitating area. The surface portions of molded products are formed by the small flow having passed through the flow-hesitating area. Thus, by changing the direction of the small flow with the merged resin flow, weld can become less noticeable.

Further, since the flow-hesitating area of the flow-advancing area is provided in the cavity by the protrusions, a portion of a molded product corresponding to the flow-advancing area can be prevented from projecting from the other portions of the molded product. Accordingly, the invention is applicable even when it is preferable that no projection is provided on the surface of a molded product.

Preferably in the aspect of the invention, a distance (L) from the resin-flow merger point to a plane including end surfaces of the protrusions adjacent to the resin-flow merger point and a thickness (t) of a typical area corresponding to an area other than the flow-advancing area and the flow-hesitating area of the cavity satisfy a relationship of L≧t.

According to such an arrangement, since the distance (L) and the thickness (t) satisfy the relationship of L≧t, a sufficient amount of the merged resin flow can be generated, thereby making weld less noticeable. When (L) is less than (t), a sufficient amount of the merged resin flow cannot be generated, so that weld may not become less noticeable.

A molded product according to a still further aspect of the invention is molded using the above-described injection-molding die.

According to the aspect of the invention, since molded products are molded using the above-described injection-molding die, weld can be made less noticeable and the molded products can have favorable appearance.

BEST MODE FOR CARRYING OUT THE INVENTION

Exemplary embodiment(s) of the invention will be described below with reference to the attached drawings.

[First Exemplary Embodiment]

Figure 1:
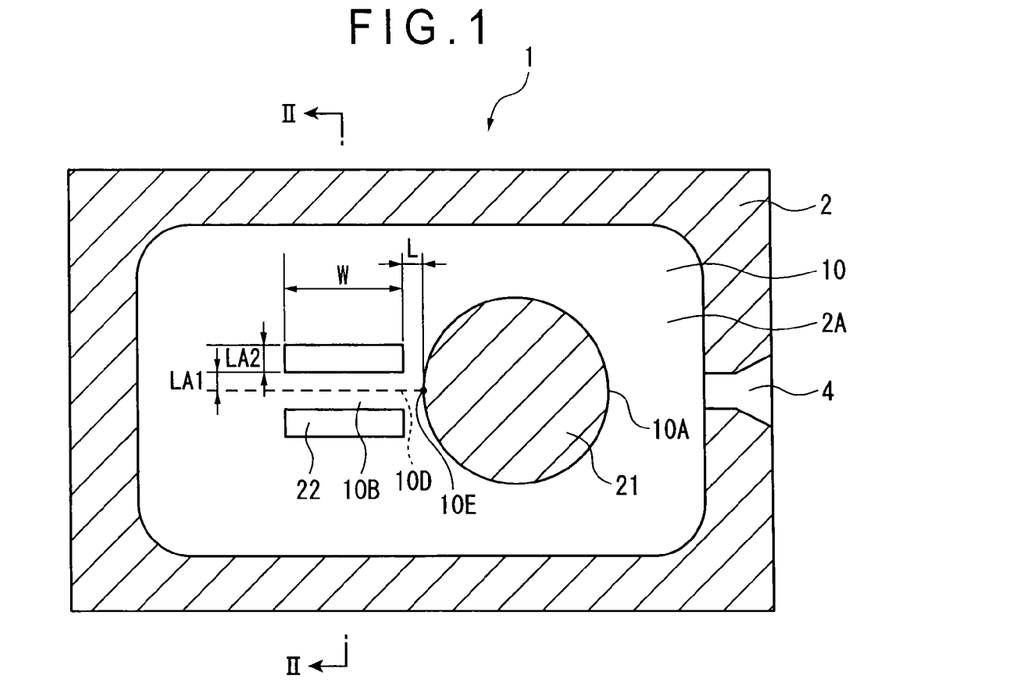
FIG. 1 is a cross-sectional view planarly showing an injection-molding die according to a first exemplary embodiment of the invention.
Figure 2:
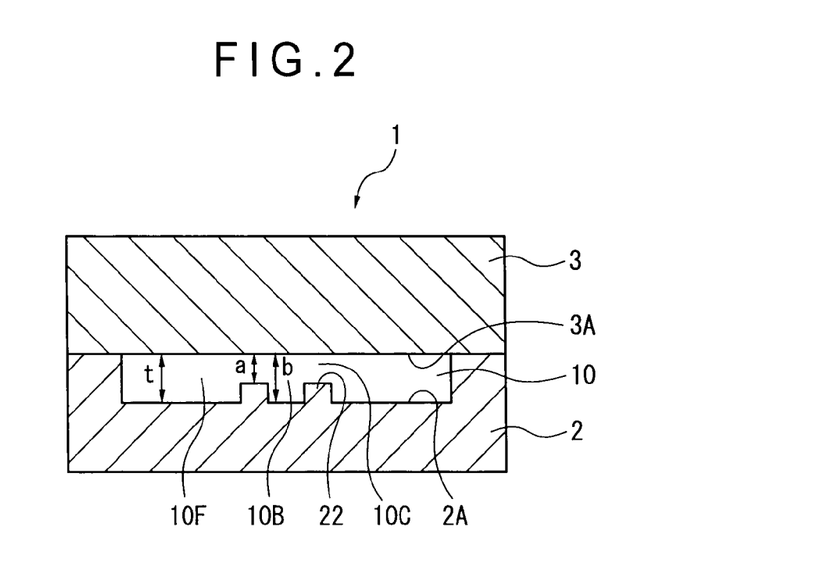
FIG. 2 shows a cross section taken along a segment II-II in FIG. 1.

FIG. 1 is a cross-sectional view planarly showing an injection-molding die 1 according to the first exemplary embodiment of the invention, and FIG. 2 shows a cross section of the injection-molding die 1 taken along the segment II-II in FIG. 1.

The injection-molding die 1 includes: a fixed die 2; a movable die 3; a cavity 10 defined by the fixed die 2 and the movable die 3; and a gate 4 for injecting a melt resin into the cavity 10.

According to FIG. 1, the fixed die 2 includes: a circular projection 21 provided substantially at the center of a cavity surface 2A slightly adjacent to the gate 4 and adapted to abut on a cavity surface 3A (see FIG. 2) of the movable die 3 when the dies are closed for providing a molded product with an opening; and two protrusions 22 provided opposite to the gate 4 relative to the projection 21 of the cavity surface 2A and adapted to protrude into the cavity 10.

As shown in FIGS. 1 and 2, the two protrusions 22, which each are shaped in a rectangular solid, are disposed such that their longer sides are parallel to the axial direction of the gate 4.

As shown in FIGS. 1 and 2, the cavity 10 is a substantially rectangular hollow portion formed in a portion sandwiched between the fixed die 2 and the plate-like movable die 3. The cavity 10 includes: a flow-dividing structure 10A for dividing a flow of the melt resin injected in the cavity 10 from the gate 4 into two resin flows; a flow-advancing area 10B where the two resin flows divided by the flow-dividing structure 10A are merged together; and a flow-hesitating area 10C that neighbors the flow-advancing area 10B.

The flow-dividing structure 10A includes the above-described projection 21 of the fixed die 2.

In FIG. 1, the flow of the melt resin injected in the cavity 10 from the gate 4 is divided by the flow-dividing structure 10A evenly into the two resin flows of an upper flow and a lower flow. The two resin flows are merged together at a predicted merger line 10D shown in a dashed line at a side opposite to the gate 4 relative to the projection 21 of the cavity 10. Accordingly, the predicted merger line 10D and its vicinity serve as the flow-advancing area 10B. The above-described protrusions 22 are disposed parallel to each other at such positions as to be symmetric about the predicted merger line 10D.

In FIG. 1, a point at which the predicted merger line 10D intersects with the projection 21 of the cavity 10 represents a resin-flow merger point 10E at which a merger of the resin flows initially takes place in the flow-advancing area 10B. The protrusions 22 are provided at positions spaced apart by a predetermined distance from the resin-flow merger point 10E in a direction where the resin flow is headed. Preferably, a relationship of L≧t is satisfied between a distance (L) from the resin-flow merger point 10E to a plane that includes end surfaces of the protrusions 22 adjacent to the resin-flow merger point 10E and a thickness (t) of a typical area 10F of the cavity 10 shown in FIG. 2 (i.e., a thickness of an area other than the flow-advancing area 10B and the flow-hesitating area 10C).

As shown in FIG. 2, the flow-hesitating area 10C of the flow-advancing area 10B is an area defined by the protrusions 22 of the fixed die 2 within the cavity 10 to be thinner than the other areas of the cavity 10. As shown in FIGS. 1 and 2, the protrusions 22 of the fixed die 2 and the flow-hesitating area 10C of the fixed die 2 are provided at such positions as to interpose the flow-advancing area 10B therebetween.

Preferably, a relationship of 0.4≦a/b≦0.9 is satisfied between a thickness (a) of the flow-hesitating area 10C and a thickness (b) of the flow-advancing area 10B in FIG. 2. More preferably, a relationship of 0.5≦a/b≦0.8 is satisfied therebetween.

In manufacturing molded products, the fixed die 2 and the movable die 3 are closed, and the melt resin is injected from the gate 4 by use of a suitable device.

Figure 3:
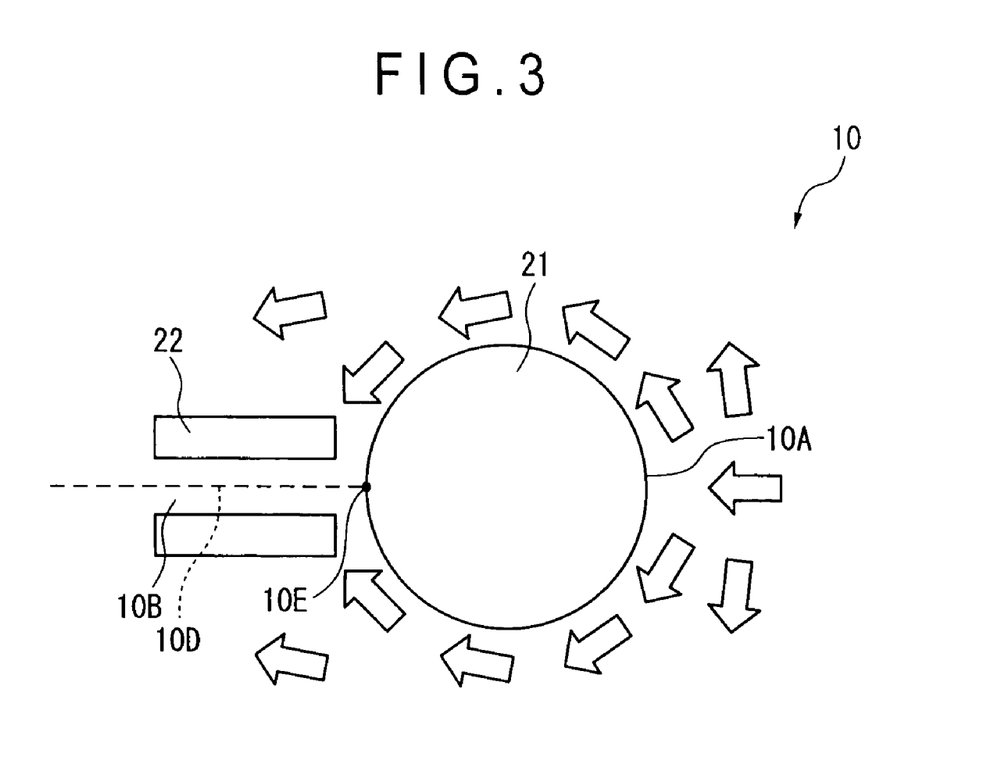
FIG. 3 shows a predicted flow of a melt resin when the melt resin is to be injection-molded by use of the injection-molding die according to the first exemplary embodiment.

FIG. 3 shows a predicted flow of the melt resin at the time of injection molding. As is indicated by arrow marks, the flow of the melt resin injected in the cavity 10 from the gate 4 (located on the right in FIG. 3) is divided by the flow-dividing structure 10A evenly into the two resin flows of an upper flow and a lower flow. Then, the two resin flows are merged together in the flow-advancing area 10B. At this time, since the flow-hesitating area 10C (i.e., thinner area defined by the protrusions 22 within the cavity 10) allows less passage of the melt resin, a resin flow having passed through the flow-hesitating area 10C becomes a small flow. On the other hand, since the protrusions 22 are provided at the positions spaced apart by the predetermined distance from the resin-flow merger point 10E (i.e., where the merger of the resin flows initially takes place in the flow-advancing area 10B) in the direction where the resin flow is headed, the melt resin can flow to the resin-flow merger point 10E without restriction, so that the resin flows can be merged together without hindrance. With this arrangement, a large merged resin flow flows along the flow-advancing area 10B while changing a direction of the small flow having passed through the flow-hesitating area 10C.

According to the above-described exemplary embodiment, the following advantages can be obtained.

(1) Since the flow-advancing area 10B, where a plurality of resin flows generated by the flow-dividing structure 10A are merged together, is formed thicker than the flow-hesitating area 10C, the melt resin exhibits less flow resistance at the flow-advancing area 10B relative to the flow-hesitating area 10C. This arrangement realizes generation of a resin flow (merged resin flow) that starts from the resin-flow merger point 10E where the resin flows are initially merged together in the flow-advancing area 10B and flows along the flow-advancing area 10B. In other words, while the resin flows confront each other at the flow-advancing area to be sequentially merged together when a conventional die is used, the merged resin flow is generated to flow along the flow-advancing area 10B according to the aspect of the invention. Thus, weld becomes less noticeable particularly at the surface portion. Accordingly, without relying on post-process or special device, molded products having favorable appearance can be obtained.

(2) Since the thickness (a) of the flow-hesitating area 10C and the thickness (b) of the flow-advancing area 10B satisfy the relationship of 0.4≦a/b≦0.9, favorable fluidity of the melt resin can be secured. Thus, the merged resin flow can be easily generated, thereby making weld much less noticeable.

(3) The large merged resin flow flows along the flow-advancing area 10B while changing a direction of the small flow having passed through the flow-hesitating area 10C. Thus, the direction of the small flow that forms the surface portion of a molded product is changed, thereby making weld much less noticeable.

(4) Since the flow-hesitating area 10C of the flow-advancing area 10B is provided in the cavity 10 by the protrusions 22, a portion of a molded product corresponding to the flow-advancing area 10B can be prevented from projecting from the other portions of the molded product. Accordingly, the invention is applicable even when it is preferable that no projection is provided on the surface of a molded product.

(5) Since the distance (L) and the thickness (t) satisfy the relationship of L≧t, a sufficient amount of the merged resin flow can be generated, thereby making weld less noticeable.

[Second Exemplary Embodiment]

Figure 4:
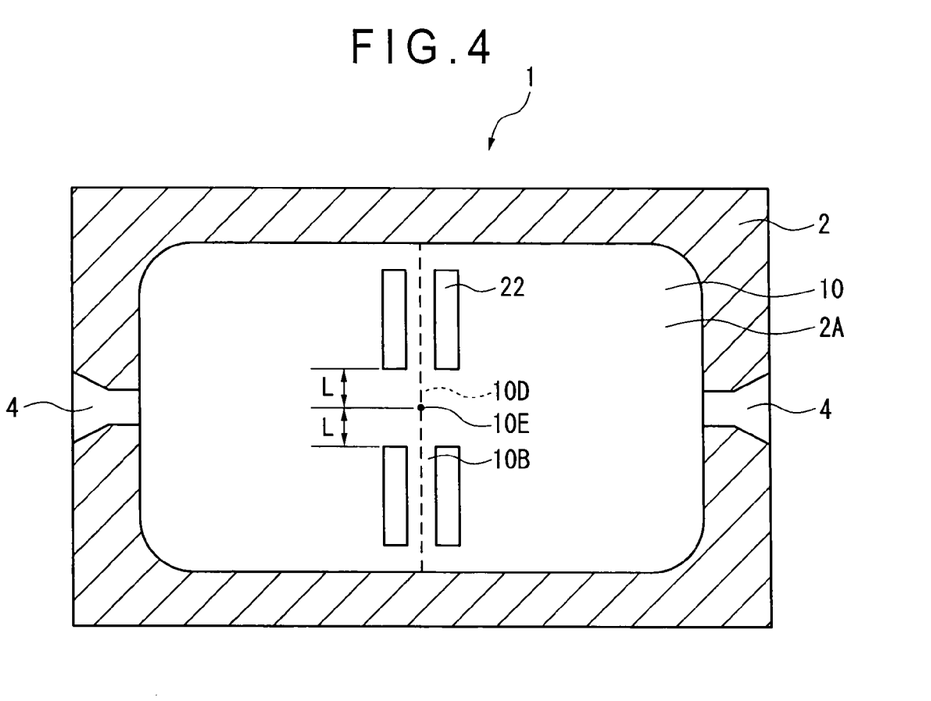
FIG. 4 is a cross-sectional view planarly showing an injection-molding die according to a second exemplary embodiment of the invention.

FIG. 4 is a cross-sectional view planarly showing an injection-molding die 1 according to a second exemplary embodiment of the invention. This exemplary embodiment differs from the above-described first exemplary embodiment in whether or not the projection 21 is provided and in the arrangements of the gate 4 and the protrusions 22. The other arrangements and functions, which are the same as above, will be denoted by the same numerals, of which description will be omitted.

As shown in FIG. 4, the fixed die 2 includes: two gates 4 provided on left and right ends of the die 2 respectively for injecting a melt resin into the cavity 10; and four protrusions 22 each of which has the same shape as the one used in the above-described first exemplary embodiment. In this exemplary embodiment, no projection 21 is provided in the fixed die 2.

In FIG. 4, flows of the melt resin injected in the cavity 10 from the two gates 4 are predicted to be merged together at the predicted merger line 10D shown in a dashed line. Accordingly, the predicted merger line 10D and its vicinity serve as the flow-advancing area 10B. Incidentally, the resin-flow merger point 10E, at which a merger of the resin flows initially takes place in the flow-advancing area 10B, is positioned at the center of the predicted merger line 10D of the flow-advancing area 10B.

The four protrusions 22 are disposed such that pairs of two protrusions 22 each are coaxially juxtaposed parallel to the predicted merger line 10D. A first pair of two protrusions 22 linearly juxtaposed on one side and a second pair of two protrusions 22 on the other side are symmetric with each other about the predicted merger line 10D. Distances (L) from the resin-flow merger point 10E to planes that include end surfaces of the four protrusions 22 adjacent to the resin-flow merger point 10E are all equal. The distances (L) are set in the same manner as in the first exemplary embodiment.

In manufacturing molded products, the fixed die 2 and the movable die 3 are closed, and the melt resin is injected from the two gates 4 by use of a suitable device.

Figure 5:
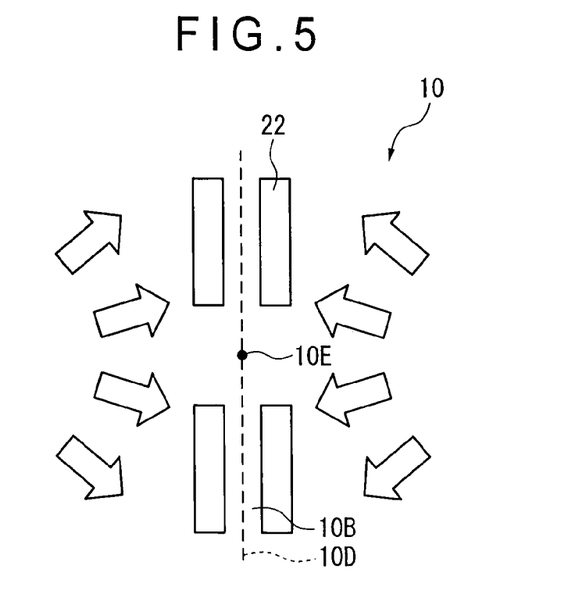
FIG. 5 shows a predicted flow of a melt resin when the melt resin is to be injection-molded by use of the injection-molding die according to the second exemplary embodiment.

FIG. 5 shows a predicted flow of the melt resin at the time of injection molding. The two resin flows of the resin injected into the cavity 10 from the two gates 4 located on the right and left in FIG. 5 respectively pass through the thinner flow-hesitating area 10C (above the protrusions 22 shown in FIG. 5), and are subsequently merged together at the flow-advancing area 10B (particularly in the vicinity of the predicted merger line 10D). At this time, since the flow-hesitating area 10C (i.e., thinner area defined by the protrusions 22 within the cavity 10) allows less passage of the melt resin, a resin flow having passed through the flow-hesitating area 10C becomes a small flow. On the other hand, since the protrusions 22 are provided at the positions spaced apart by the predetermined distance from the resin-flow merger point 10E (i.e., where the merger of the resin flows initially takes place in the flow-advancing area 10B) in the direction where the resin flow is headed, the melt resin can flow to the resin-flow merger point 10F without restriction, so that the resin flows can be merged together without hindrance. With this arrangement, a large merged resin flow flows along the flow-advancing area 10B while changing a direction of the small flow having passed through the flow-hesitating area 10C.

According to this exemplary embodiment, the following advantage (6) can be obtained instead of the advantage (1) of the first exemplary embodiment. This exemplary embodiment also provides the same advantages as the advantages (2) to (5) of the first exemplary embodiment.

(6) Since the flow-advancing area 10B, where the resin flows of the melt resin injected from the two gates 4 are merged together, is formed thicker than the flow-hesitating area 10C, the melt resin exhibits less flow resistance at the flow-advancing area 10B relative to the flow-hesitating area 10C. This arrangement realizes generation of a resin flow (merged resin flow) that starts from the resin-flow merger point 10E where the resin flows are initially merged together in the flow-advancing area 10B and flows along the flow-advancing area 10B. In other words, while the resin flows confront each other at the flow-advancing area to be sequentially merged together when a conventional die is used, the merged resin flow is generated to flow along the flow-advancing area 10B according to the aspect of the invention. Thus, weld becomes less noticeable particularly at the surface portion. Accordingly, without relying on post-process or special device, molded products having favorable appearance can be obtained <Modification(s)>

It should understood that the scope of the invention is not limited to the above-described exemplary embodiment(s) but includes modifications and improvements as long as such modifications and improvements are compatible with the invention.

(i) The protrusions 22 each may not be necessarily in the shape of rectangular solid as in the above-described embodiments, but may be in the other shape as long as the thinner flow-hesitating area 10C is provided within the cavity 10. For instance, corners of the protrusions 22 adjacent to the cavity 10 may be rounded. This arrangement can prevent generation of turbulent flow when the resin flows collide with the protrusions 22.

Figure 6:
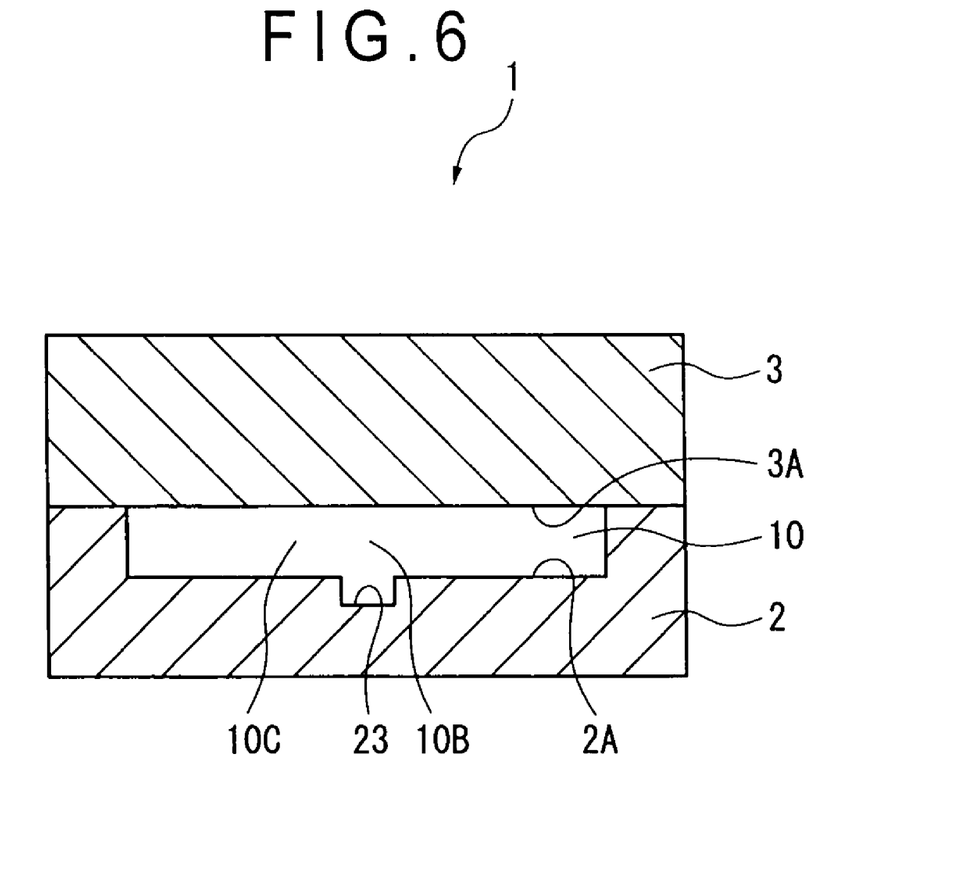
FIG. 6 is a cross-sectional view showing a die according to a modification of the exemplary embodiment(s).

(ii) As shown in FIG. 6, the injection-molding die 1 may include a fixed die 2 that is provided with a recess 23 in place of the protrusions 22 at a position corresponding to the flow-advancing area 10B. With this arrangement, areas other than the flow-advancing area 10B of the cavity 10 serve as the flow-hesitating area 10C, and the flow-advancing area 10B is formed thicker than the flow-hesitating area 10C. Thus, the melt resin exhibits less flow resistance at the flow-advancing area 10B relative to the flow-hesitating area 10C. Accordingly, the merged resin flow is generated, thereby making weld less noticeable. Accordingly, without relying on post-process or special device, molded products having favorable appearance can be obtained.

(iii) The cavity surface 3A of the movable die 3 may be provided with a grain pattern. With this arrangement, the surface of molded products can be decorated with a design.

(iv) The gate(s) 4 may be a sequential valve gate. With this arrangement, molded products having more favorable appearance can be obtained.

(v) The resin to be used is not specifically limited. The invention is applicable to molding with use of any type of resin, as long as the resin is such a thermoplastic resin structured to form weld.

Further, the specific arrangements and configurations in implementing the invention may be altered in any manner as long as such alternation is compatible with the invention.

EXAMPLE(S)

The invention will be described in a further detail by exemplifying examples and comparatives. It should be understood that the invention is not limited at all by the description of the examples and comparatives.

Examples 1 to 3

Injection molding was conducted with use of the injection-molding die 1 according to the above first exemplary embodiment, and evaluation was conducted on appearance of obtained molded products. In the injection-molding dies 1 used in the examples 1 to 3, the protrusions 22 were differently sized and differently disposed. Commonly in the injection-molding dies 1 used in the examples 1 to 3 and the later-described comparisons 1 and 2, the cavity 10 had a size of 600 mm by 250 mm and the thickness (t) of 3 mm, and the projection 21 had a diameter of 85 mm. Composition of the resin used in the injection molding was as follows:

α-olefin copolymer (product name: tafmer, manufactured by Mitsui Chemicals, Inc.) . . . 15 mass %;

talc . . . 20 mass %;

PP (product name: J709QG, manufactured by Prime Polymer Co., Ltd.) . . . 65 mass %; and resin additives . . . minute amount.

Comparative 1

Injection molding was conducted with use of an injection-molding die 1 that was different from the die of the second exemplary embodiment only in the disposition of the protrusions 22 (distances L), and evaluation was conducted on appearance of obtained molded products.

Comparative 2

Injection molding was conducted with use of an injection-molding die 1 provided by omitting the protrusions 22 from the die 1 of the first exemplary embodiment, and evaluation was conducted on appearance of obtained molded products.

Table 1 shows the dimensions and dispositions of the protrusions 22 in the injection-molding dies 1 used in the examples 1 to 3 and the comparatives 1 and 2 and results of the evaluation on the appearance of the obtained molded products. In Table 1: W represents a lengthwise length of the protrusion 22; LA2 represents a width of the protrusion 22; and LA1 represents a distance from the predicted merger line 10D of the flow-advancing area 10B to the end surface of the protrusion 22 adjacent to the predicted merger line 10D (see also FIG. 1). The other dimension symbols (such as (a), (b) and (L)) conform to those of the first exemplary embodiment. In evaluating the appearance, a rating of "G" was given to a molded product having an obscured weld line on its surface and having improved appearance quality while a rating of "N" was given to a molded product having a clear weld line on its surface.

TABLE 1

|  | W | LA1 | LA2 | L | a | b | Appearance of molded product |
|---|---|---|---|---|---|---|---|
| Example 1 | 30 | 7.5 | 30 | 6.0 | 2.5 | 3.0 | G |
| Example 2 | 50 | 7.5 | 30 | 6.0 | 2.5 | 3.0 | G |
| Example 3 | 80 | 5.0 | 10 | 4.0 | 2.5 | 3.5 | G |

TABLE 1-continued

|  | W | LA1 | LA2 | L | a | b | Appearance of molded product |
|---|---|---|---|---|---|---|---|
| Comparative 1 | 50 | 7.5 | 30 | 1.0 | 2.5 | 3.0 | N |
| Comparative 2 | — | — | — | — | — | 3.0 | N |

Numeric values are shown in mm.
Since no protrusion 22 is provided in the comparative 1, only the thickness of the cavity is shown as (b).

Evaluation Results

As shown in Table 1, the molded products respectively obtained from the examples 1 to 3 had favorable appearance. On the other hand, the molded products respectively obtained from the comparatives 1 and 2 had clear weld on their surfaces.

According to the examples 1 to 3 and the comparatives 1 and 2, when the injecting-molding die 1 having the flow-dividing structure 10A substantially satisfies the following conditions:

$W \geq 30$[mm];
$3$[mm]$\leq LA1 \leq 30$[mm];
$LA2 \geq 10$[mm];
$L \geq t$; and
$0.4 \leq a/b \leq 0.9$, weld can be made less noticeable and molded products having favorable appearance can be obtained.

An injection-molding die according to an aspect of the invention is usable in manufacturing automobile interior parts such as installment panel and door panel. A molded product according to another aspect of the invention is applicable as an automobile interior part having favorable appearance without weld such as installment panel and door panel.

The invention claimed is:

1. An injection-molding die, comprising:
a fixed die;
a movable die;
a cavity defined by the fixed die and the movable die; and
a gate for injecting a melt resin into the cavity,
wherein the cavity includes
a flow-dividing structure that divides a flow of the melt resin injected into the cavity into a plurality of resin flows, and
a flow-advancing area in which the plurality of resin flows generated by the flow-dividing structure are merged together,
wherein a thickness (a) of the flow-advancing area is thicker than a thickness (b) of a flow-hesitating area of the flow-advancing area in the cavity, and
wherein the thickness (a) of the flow-hesitating area and the thickness (b) of the flow-advancing area satisfy a relationship of $0.4 \leq a/b \leq 0.9$.

2. An injection-molding die, comprising:
a fixed die;
a movable die;
a cavity defined by the fixed die and the movable die; and
a plurality of gates for injecting a melt resin into the cavity,
wherein the cavity includes a flow-advancing area in which resin flows of the melt resin injected from the plurality of gates are merged together,
wherein a thickness (a) of the flow-advancing area is thicker than a thickness (b) of a flow-hesitating area of the flow-advancing area in the cavity, and
wherein the thickness (a) of the flow-hesitating area and the thickness (b) of the flow-advancing area satisfy a relationship of $0.4 \leq a/b \leq 0.9$.

3. The injection-molding die according to claim 1, wherein at least either one of the fixed die and the movable die includes protrusions provided at positions to interpose the flow-advancing area therebetween, the protrusions protruding into the cavity, and
wherein the protrusions provide the flow-hesitating area of the flow-advancing area in the cavity, the positions of the protrusions being spaced apart by a predetermined distance from a resin-flow merger point in a direction in which the resin flows are headed, the resin-flow merger point being a point at which the resin flows are initially merged together in the flow-advancing area.

4. The injection-molding die according to claim 3, wherein a distance (L) from the resin-flow merger point to a plane including end surfaces of the protrusions adjacent to the resin-flow merger point and a thickness (t) of a typical area corresponding to an area other than the flow-advancing area and the flow-hesitating area of the cavity satisfy a relationship of $L \geq t$.

5. The injection-molding die according to claim 2, wherein at least either one of the fixed die and the movable die includes protrusions provided at positions to interpose the flow-advancing area therebetween, the protrusions protruding into the cavity, and
wherein the protrusions provide the flow-hesitating area of the flow-advancing area in the cavity, the positions of the protrusions being spaced apart by a predetermined distance from a resin-flow merger point in a direction in which the resin flows are headed, the resin-flow merger point being a point at which the resin flows are initially merged together in the flow-advancing area.

6. The injection-molding die according to claim 5, wherein a distance (L) from the resin-flow merger point to a plane including end surfaces of the protrusions adjacent to the resin-flow merger point and a thickness (t) of a typical area corresponding to an area other than the flow-advancing area and the flow-hesitating area of the cavity satisfy a relationship of $L > t$.

7. The injection-molding die according to claim 3, wherein a length (W) of each of the protrusions is greater than or equal to 30 mm.

* * * * *